United States Patent [19]

Tysver

[11] Patent Number: 4,909,654

[45] Date of Patent: Mar. 20, 1990

[54] THREE DIRECTIONAL LOAD REACTING MOUNT

[75] Inventor: John D. Tysver, Rockford, Ill.

[73] Assignee: Sundstrand Corporation, Rockford, Ill.

[21] Appl. No.: 224,715

[22] Filed: Jul. 27, 1988

[51] Int. Cl.[4] ............................................. F16D 1/12
[52] U.S. Cl. ................................... 403/79; 403/157; 403/131; 248/289.1
[58] Field of Search ............... 403/157, 158, 156, 114, 403/131, 79, 65, 71, 59, 61, 76, 159, 161; 248/289.1

[56] References Cited

U.S. PATENT DOCUMENTS

| | | | |
|---|---|---|---|
| 2,337,146 | 12/1943 | Astrom et al. | 403/131 X |
| 2,942,291 | 6/1960 | Flint | 403/79 X |
| 3,176,805 | 4/1965 | Gandy | 403/131 X |
| 3,794,392 | 2/1974 | Scott | 403/79 X |
| 3,923,349 | 12/1975 | Herbst | 403/79 X |
| 3,945,737 | 3/1976 | Herbenar | |
| 4,139,245 | 2/1979 | McCloskey | |
| 4,243,192 | 1/1981 | Johnson | 403/158 X |
| 4,243,339 | 1/1981 | Dickerson | 403/157 X |
| 4,491,436 | 1/1985 | Easton | 403/131 X |
| 4,786,202 | 11/1988 | Arnold et al. | 403/156 X |

Primary Examiner—Randolph A. Reese
Assistant Examiner—Peter M. Cuomo
Attorney, Agent, or Firm—Antonelli, Terry & Wands

[57] ABSTRACT

A three directional load reacting mount connects first and second members together through a plain, self aligning ball bearing. An axial member extends through the ball of the bearing. An axial force on one of the members is not transmitted to the other through the bearing but at an axial load bearing element offset from the bearing. The offset is in the direction of a supporting structure connected to the other member thereby reducing the moment transmitted to the supporting structure from the axial force.

15 Claims, 1 Drawing Sheet

THREE DIRECTIONAL LOAD REACTING MOUNT

TECHNICAL FIELD

The present invention relates to a structural mount which has three dimensional load reaction capability. In particular, it relates to such a structural mount which transmits loads through a plain, self aligning bearing such as a single ball type bearing.

BACKGROUND ART

A known three dimensional load reacting mount transmits loads from all directions through a plain, self aligning bearing, particularly a single ball type bearing. A single ball type bearing or mount allows for angular misalignment and movement while maintaining proper load reaction. This type of bearing is capable of high radial load reaction, but relatively low axial load reaction. This can be a problem in the applications where high axial load reaction is required.

In applications of three dimensional load reaction mounts for supporting a member from a structural support, for example where the load reacting mount is necessarily supported outwardly from the structural support, axially directed loads applied to the member can result in considerable moment being applied to the structural support by way of the ball bearing. This limits the axial forces which a given mounting arrangement can safely transmit or requires an increase in the strength, hence weight, of the components of the mount and structural support. However, such a solution may not be acceptable in those applications where the weight or size of the mount is necessarily limited, as in aircraft structures.

Thus, there is a need for an improved three dimensional load reacting mount which overcomes the aforementioned problems of the known three dimensional load reacting mount. More particularly, there is a need for an improved three dimensional load reacting mount which is capable of transmitting higher axial loads while at the same time decreasing the moment applied to the associated supporting structure as a result of the transmission of such higher axial load.

DISCLOSURE OF THE INVENTION

An object of the present invention is to provide an improved three dimensional load reacting mount which overcomes the aforementioned problems associated with the known three dimensional load reacting mount. Specifically, an object of the invention is to provide an improved three dimensional load reacting mount which is capable of both high radial load reaction and high axial load reaction. A further object of the invention is to provide an improved three dimensional load reacting mount which, while transmitting high axial load, reduces the moment incurred on the adjacent support structure as compared with that of the known mount.

These and other objects of the invention are attained by the use of a ball joint according to the present invention which is used in a mount. The ball joint comprises a ball; a bearing surface rotatably engaging the ball; an axial member extending through the ball and attached to a structural member with play to provide a limited degree of axial movement between the bearing surface and the ball on one hand and the structural member on the other hand; and an offset connected to the bearing surface and extending from the bearing surface and ball in a direction transverse to the axis of the axial member, the offset including an axial load bearing element associated with the offset for engaging the structural member.

The axial load bearing element is used to transmit the axial load so that the axial load is not transmitted through the bearing formed by the ball and bearing surface rotatably engaging the ball. Since the axial load bearing element is offset with respect to the bearing surface and ball in a direction transverse to the axis of the axial member, according to the invention, the axial moment transmitted to the associated support member is reduced by locating the offset closer to the support member than the bearing surface thereby reducing the length of the arm of the bending moment and hence the bending moment itself. According to the disclosed embodiment, the axial load bearing element is formed integrally with the offset and the offset extends from the bearing surface and ball in a direction orthogonal to the axis of the axial member.

A three directional load reacting mount according to the invention for connecting first and second members together comprises an at least partially ball-shaped component, a bearing surface rotatably engaging the at least partially ball-shaped component, an axial member extending from the at least partially ball-shaped component in an axial direction and connected to the first member, the bearing surface being connected to the second member, an axial force transmitting means for transmitting a force in an axial direction on the second member to the first member at a location offset with respect to the at least partially ball-shaped component and the bearing surface. In the disclosed embodiment of the invention, the axial member extends through the at least partially ball-shaped component and is connected between opposed spaced portions of the first member which form a clevis. The bearing surface and a portion of the second member are located between the opposed spaced portions of the first member. The axial force transmitting means is provided on a leading end of the second member located between the opposed spaced portions of the first member for engaging the first member to transmit force in the axial direction on the second member to the first member.

Another feature of the invention involves providing a rounded, crowned surface on the axial force transmitting means which engages the first member. This permits tilting of the first and second members with respect to each other while transmitting the axial force. The leading end of the second member projects laterally from both sides of the crowned surface to form stops which engage the first member to limit the tilting of the first and second members with respect to each other.

These and other objects, features and advantages of the present invention will become more apparent from the following description when taken in connection with the accompanying drawings, which show, for purposes of illustration only, one preferred embodiment in accordance with the present invention.

BEST MODE FOR CARRYING OUT THE INVENTION

Figure 1:
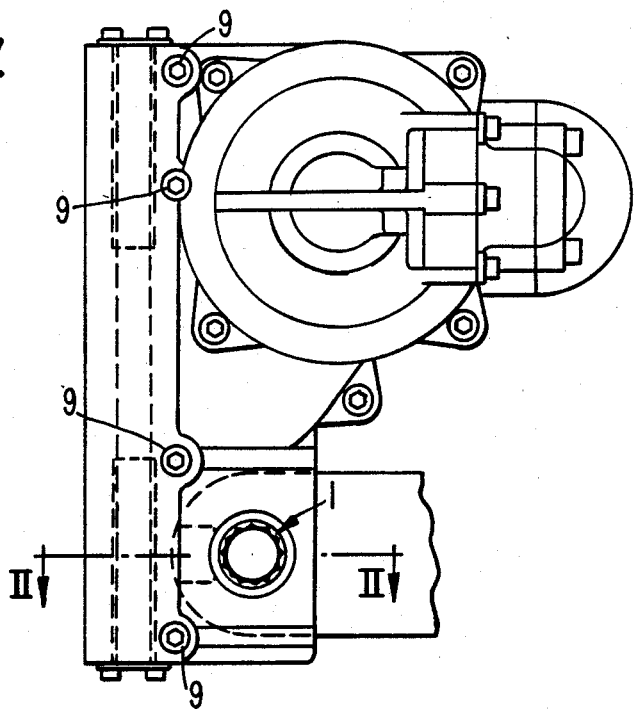
FIG. 1 is a side view of a three directional load reacting mount according to a preferred embodiment of the invention.

Referring now to the drawings, a three directional load reacting mount 1 of the invention is shown connecting a structural member 2 to a supporting structure 3 such as an aircraft structure. The structural member 2 has a leading end or tongue 4 which is located between and connected to spaced opposed portions 5 and 6 forming a clevis 7 of a member 8 which, in turn, is allowed to slide on supporting structure 3, with motion controlled by rack and pinion gearing.

The leading end or tongue 4 of the structural member 2 has a hole 10 therethrough for receiving an axial member or pin 11. The axial member 11 extends through corresponding apertures in the spaced opposed portions 5 and 6 of the clevis 7 and is connected to the spaced portions 5 and 6 by means of a flanged head 12 at one end and a threaded nut 13 received on the threaded, other end of the axial member. The axial member is not tightly secured against axial movement in the direction of the axis A—A thereof, with respect to the spaced opposed portions 5 and 6 of the clevis 7 since a small amount of clearance or play 14 is provided between the outer surfaces of the opposed portions 5 and 6 and the adjacent threaded nut 13 and flanged head 12. This clearance permits slight axial movement of the axial member 11 so that axially directed forces on the structural member 2, such as force F shown in FIG. 2, will be transmitted to the clevis 7 of member 8 and thereby to the supporting structure 3 by way of an axial load bearing element 15 which is offset orthogonally from the axis A—A of the axial member 11 in the direction of the supporting structure 3 as discussed below.

A single ball bearing 16, known in the trade as a uniball bearing, is provided between the leading end or tongue 4 of the structural member 2 and the axial member or pin 11 connected to the spaced opposed portions 5 and 6 of the clevis 7 of member 8. The bearing 16 comprises a ball 17 through which the axial member 11 extends, the ball being secured to the axial member 11. The outer surface of the ball 17 is rotatably engaged by a bearing surface 18 connected to the leading end or tongue 4 of the structural member 2. The bearing 16 permits rotation of the structural member 2 about the axis A—A through the axial member 11 and also slight tilting of the structural member 2 with respect to the member 8. The bearing 16 reacts loads between the structural member 2 and member 8 and supporting structure 3 which are in a plane perpendicular to the axis A—A through the axial member. However, axial loads, such as load F, in the direction of the axis A—A of the axial member, are transmitted through the mount 1 at the axial load bearing element 15 offset from the bearing 16 in the direction of the supporting structure 3.

Figure 2:
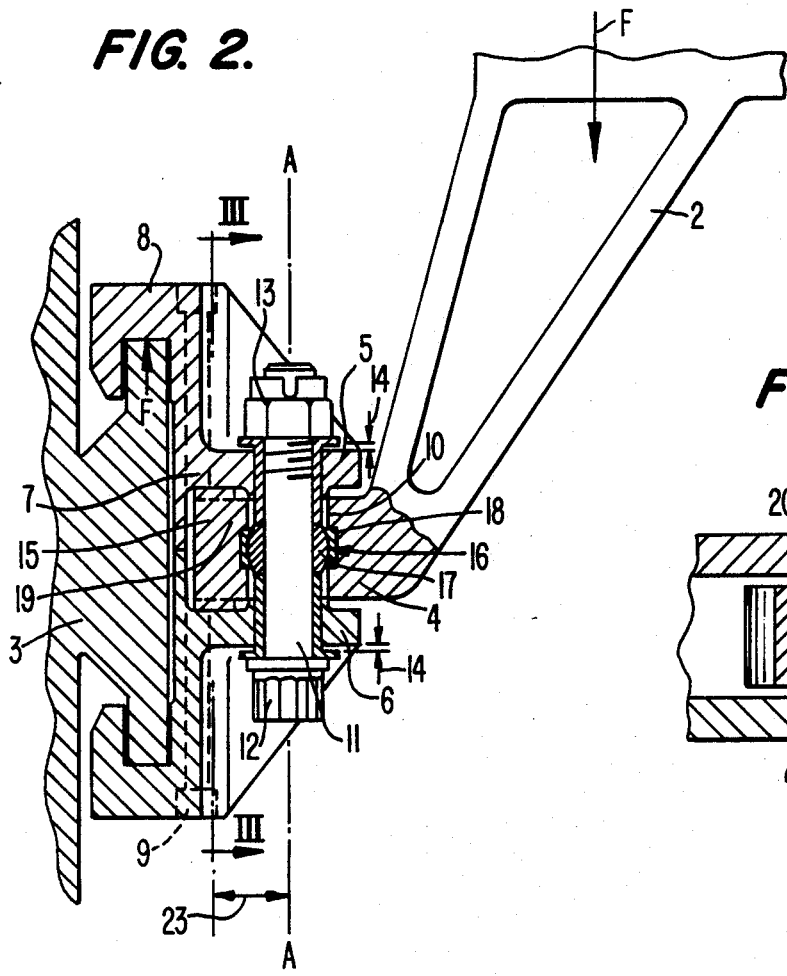
FIG. 2 is a cross-sectional view of the mount of FIG. 1 taken along the line II—II in FIG. 1.
Figure 3:
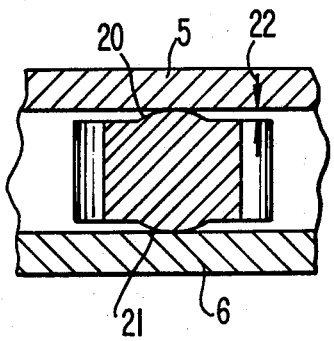
FIG. 3 is a cross-sectional view of a portion of the mount shown in FIGS. 1 and 2 taken along the line III—III in FIG. 2 and illustrating the rounded, crowned axial load bearing element in engagement with the surfaces of the adjacent supporting structure.

As shown in FIGS. 2 and 3, the axial load bearing element 15 is formed integrally with an offset portion 19 of the leading end or tongue 4. The offset extends from the bearing surface 18 in a direction orthogonal to the axis A—A of the axial member 11. The surfaces 20 and 21 of the axial load bearing element 15 are rounded, crowned surfaces which engage the adjacent surfaces of the spaced opposed portions 5 and 6 of clevis 7 of the member 8 for reacting axially transmitted loads placed on the structural member 2. The crowned surfaces permit tilting of the structural member 2 with respect to the member 8 and supporting structure 3. The amount of tilting permitted is limited by the clearance 22 between the opposed portions 5 and 6 and laterally protruding portions of the leading end or tongue 4 of member 2 as shown in FIG. 3. These laterally protruding portions act as stops to limit the tilting upon contacting an adjacent surface of portion 5 or 6.

As shown in FIG. 2, the longitudinal axis of the axial load bearing element 15 is spaced by a distance 23 closer to the supporting structure 3 than the bearing 16. This reduces the moment arm of the axial load and thus the axial moment on the supporting structure 3 as compared with transmission of the axial force through the bearing 16 along the axis A—A. This reduction in the moment incurred on the supporting structure is not at the expense of the rotational degrees of freedom available in the known structural mount. Also, since the uniball bearing is not required to react axial loads, higher load reactions can be attained with the mount of the invention.

While I have shown and described only one embodiment in accordance with the present invention, it is understood that the same is not limited thereto, but is susceptible to numerous changes and modifications as known to those skilled in the art. Therefore, I do not wish to be limited to the details shown and described herein, but intend to cover all such changes and modifications as are encompassed by the scope of the appended claims.

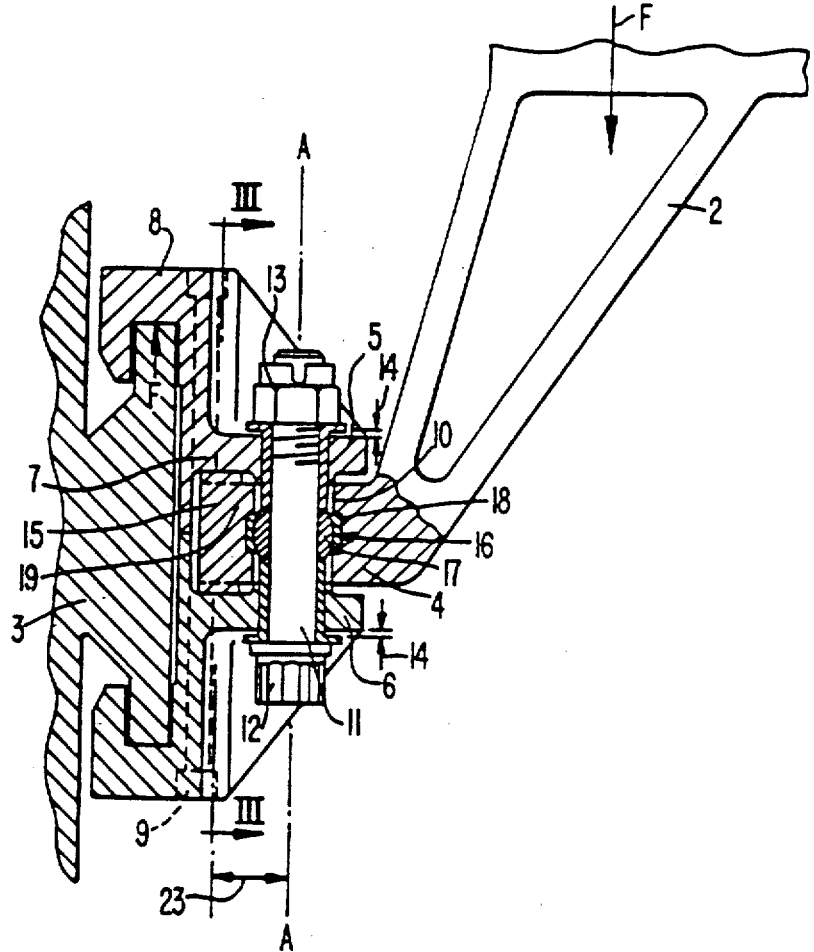

I claim:
1. A ball joint comprising:
a ball;
a bearing surface rotatably engaging the ball;
an axial member extending through the ball, said axial member having a longitudinal axis and said ball being secured to said axial member for movement therewith in a direction along said longitudinal axis;
means attaching said axial member to a structural member with play in a direction along the longitudinal axis of said axial member to provide a limited degree of axial movement between the bearing surface, the ball and the axial member on one hand and the structural member on the other hand; and
an offset connected to said bearing surface and extending from said bearing surface and ball in a direction transverse to the longitudinal axis of the axial member, said offset including an axial load bearing element associated with the offset which engages said structural member for reacting axially transmitted loads placed on said bearing surface.

2. A ball joint according to claim 1, wherein said axial load bearing element is formed integrally with the offset.

3. A ball joint according to claim 1, wherein said offset extends from the bearing surface and ball in a direction orthogonal to the axis of the axial member.

4. A joint for pivotably connecting first and second members comprising an at least partially ball-shaped component, a bearing surface rotatably engaging the at least partially ball-shaped component, an axial member secured to and extending from the at least partially ball-shaped component in an axial direction and connected to said first member with play in the axial direction, said bearing surface being connected to said second member, an axial force transmitting means connected to said second member and engaging said first member for transmitting a force acting in the axial direction on said second member to said first member at a location offset in a direction transverse to said axial direction from said at least partially ball-shaped component and bearing surface.

5. A joint according to claim 4, wherein said axial force transmitting means includes an axial load bearing element connected to said second member, said axial load bearing element being offset from said at least partially ball-shaped component and said bearing surface in a direction orthogonal to the axial direction where it engages said first member.

6. A joint according to claim 4, wherein said axial force transmitting means comprises a crowned surface of an axial load bearing element which engages the first member to permit tilting of said first and second members with respect to each other while transmitting said axial force.

7. A joint according to claim 6, wherein the surface of said loading bearing element further includes stops on opposite sides of said crowned surface which engage said second member to limit the degree of tilting of the first and second members with respect to each other.

8. A three directional load reacting mount for connecting first and second members together, comprising an at least partially ball-shaped component, a bearing surface rotatably engaging the at least partially ball-shaped component, an axial member extending from the at least partially ball-shaped component in an axial direction and connected to said first member, said bearing surface being connected to said second member, and axial force transmitting means for transmitting a force in the axial direction on said second member to the first member at a location offset in a direction transverse to the axial direction with respect to said at least partially ball-shaped component and said bearing surface.

9. A mount according to claim 8, wherein said axial member extends through said at least partially ball-shaped component.

10. A mount according to claim 9, wherein said axial member extends between and is connected to opposed spaced portions of said first member.

11. A mount according to claim 10, wherein said bearing surface and a portion of said second member are located between the opposed spaced portions of said first member, said axial force transmitting means being provided on a leading end of said second member located between said opposed spaced portions of said first member for engaging said first member to transmit force in the axial direction on the second member to the first member.

12. A mount according to claim 11, wherein surfaces of said axial force transmitting means which engage said opposed spaced portions of the first member crowned to permit tilting of said first and second members with respect to each other while transmitting said axial force.

13. A mount according to claim 12, wherein said axial transmitting means further includes stops which engage the first member to limit the tilting of the first and second members with respect to each other.

14. A mount according to claim 8, wherein said first member is connected to a supporting structure, and wherein said axial force transmitting means transmits said axial force at a location which is offset from the at least partially ball-shaped component and the bearing surface in a direction toward said supporting structure whereby the moment transmitted to said supporting structure from said axial force is reduced.

15. A three directional load reacting mount for connecting first and second members together comprising a clevis provided on said first member and a tongue provided on said second member, said tongue and clevis being connected to one another to form a tongue and clevis type connection between said first and second members by means of an axial member which is connected at its respective ends to said clevis and which extends through an aperture formed in said tongue, ball bearing means being provided between said tongue and said axial member to permit pivoting of said tongue and second member relative to the axial member and first member, and axial force transmitting means for transmitting a force in the direction of an axis of the axial member on said second member to the first member at a location offset in a direction transverse to said axis with respect to said ball bearing means.

* * * * *

UNITED STATES PATENT AND TRADEMARK OFFICE
CERTIFICATE OF CORRECTION

PATENT NO. : 4,909,654

DATED : March 20, 1990

INVENTOR(S) : John D. Tysver

It is certified that error appears in the above-identified patent and that said Letters Patent is hereby corrected as shown below:

The title page to show the correct drawing sheet as submitted in the above-identified patent application should be deleted to appear as per attached title page.

Signed and Sealed this

Second Day of July, 1991

*Attest:*

*Attesting Officer*

HARRY F. MANBECK, JR.

*Commissioner of Patents and Trademarks*

United States Patent [19]

Tysver

[11] Patent Number: 4,909,654
[45] Date of Patent: Mar. 20, 1990

[54] THREE DIRECTIONAL LOAD REACTING MOUNT

[75] Inventor: John D. Tysver, Rockford, Ill.

[73] Assignee: Sundstrand Corporation, Rockford, Ill.

[21] Appl. No.: 224,715

[22] Filed: Jul. 27, 1988

[51] Int. Cl.⁴ ............................................. F16D 1/12
[52] U.S. Cl. .................................. 403/79; 403/157; 403/131; 248/289.1
[58] Field of Search ............... 403/157, 158, 156, 114, 403/131, 79, 65, 71, 59, 61, 76, 159, 161; 248/289.1

[56] References Cited

U.S. PATENT DOCUMENTS

| | | | |
|---|---|---|---|
| 2,337,146 | 12/1943 | Astrom et al. | 403/131 X |
| 2,942,291 | 6/1960 | Flint | 403/79 X |
| 3,176,805 | 4/1965 | Gandy | 403/131 X |
| 3,794,392 | 2/1974 | Scott | 403/79 X |
| 3,923,349 | 12/1975 | Herbst | 403/79 X |
| 3,945,737 | 3/1976 | Herbenar | |
| 4,139,245 | 2/1979 | McCloskey | |
| 4,243,192 | 1/1981 | Johnson | 403/158 X |
| 4,243,339 | 1/1981 | Dickerson | 403/157 X |
| 4,491,436 | 1/1985 | Easton | 403/131 X |
| 4,786,202 | 11/1988 | Arnold et al. | 403/156 X |

Primary Examiner—Randolph A. Reese
Assistant Examiner—Peter M. Cuomo
Attorney, Agent, or Firm—Antonelli, Terry & Wands

[57] ABSTRACT

A three directional load reacting mount connects first and second members together through a plain, self aligning ball bearing. An axial member extends through the ball of the bearing. An axial force on one of the members is not transmitted to the other through the bearing but at an axial load bearing element offset from the bearing. The offset is in the direction of a supporting structure connected to the other member thereby reducing the moment transmitted to the supporting structure from the axial force.

15 Claims, 1 Drawing Sheet